(12) United States Patent
Bouchon et al.

(10) Patent No.: US 10,612,979 B2
(45) Date of Patent: Apr. 7, 2020

(54) SPECTRAL CONVERSION ELEMENT FOR ELECTROMAGNETIC RADIATION

(71) Applicant: Office National d'Etudes et de Recherches Aérospatiales, Palaiseau (FR)

(72) Inventors: Patrick Bouchon, Verrieres le Buisson (FR); Riad Haidar, Paris (FR); Mathilde Makhsiyan, La Boisse (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 164 days.

(21) Appl. No.: 16/001,166

(22) Filed: Jun. 6, 2018

(65) Prior Publication Data

US 2018/0348060 A1 Dec. 6, 2018

(30) Foreign Application Priority Data

Jun. 6, 2017 (FR) ..................... 17 55016

(51) Int. Cl.
| | | |
|---|---|---|
| G01J 5/28 | (2006.01) |
| H01Q 9/04 | (2006.01) |
| G02F 2/02 | (2006.01) |
| H01Q 17/00 | (2006.01) |
| H01Q 13/18 | (2006.01) |
| G01J 5/08 | (2006.01) |
| H01Q 21/06 | (2006.01) |
| H01Q 1/52 | (2006.01) |
| G01J 5/00 | (2006.01) |

(52) U.S. Cl.
CPC .............. G01J 5/28 (2013.01); G01J 5/0806 (2013.01); G02F 2/02 (2013.01); H01Q 9/0407 (2013.01); H01Q 13/18 (2013.01); H01Q 17/00 (2013.01); H01Q 17/004 (2013.01); G01J 2005/0077 (2013.01); G01J 2005/283 (2013.01); G02F 2203/13 (2013.01); H01Q 1/523 (2013.01); H01Q 21/065 (2013.01)

(58) Field of Classification Search
CPC ........................................................ G01J 5/28
See application file for complete search history.

(56) References Cited

U.S. PATENT DOCUMENTS 7,358,497 B1 * 4/2008 Boreman ............. H01Q 21/064
250/332

FOREIGN PATENT DOCUMENTS

RU 2 482 527 C2 5/2013
RU 2 606 516 C2 1/2017

OTHER PUBLICATIONS

FR Search Report, dated Feb. 27, 2018, from corresponding FR 1755016 application.

* cited by examiner

*Primary Examiner* — Edwin C Gunberg
(74) *Attorney, Agent, or Firm* — Young & Thompson

(57) ABSTRACT

A spectral conversion element for electromagnetic radiation includes Terahertz antennas and infrared antennas which are distributed in pixel zones. The Terahertz antennas and the infrared antennas which are in one same pixel zone are thermally coupled, and those which are in different pixel zones are uncoupled. Such an element enables the capture of images which are formed with Terahertz radiation, by using an infrared image detector.

20 Claims, 3 Drawing Sheets

SPECTRAL CONVERSION ELEMENT FOR ELECTROMAGNETIC RADIATION

BACKGROUND OF THE INVENTION

Field of the Invention

The present invention relates to a spectral conversion element for electromagnetic radiation, and a method for collecting Terahertz radiation.

Description of the Related Art

In the scope of the present description, Terahertz radiation is called electromagnetic radiation, of which the wavelength is between 30 µm (micrometres) and 3 mm (millimetres), corresponding to a frequency which is between 0.1 THz (Terahertz), that is 100 MHz (Megahertz), and 10 THz.

Infrared radiation is called electromagnetic radiation, of which the wavelength is between 1 µm and 30 µm, corresponding to a frequency which is between 10 THz and 300 THz.

Infrared imaging, based on the detection of images which are formed from infrared radiation, called infrared images, is highly used for numerous applications. Because of this, infrared cameras are available today at a reduced cost, in particular cameras which operate in spectral ranges of wavelength between 3 µm and 5 µm, or between 8 µm and 12 µm.

Numerous applications have moreover been identified for imaging systems capable of capturing images which are formed by Terahertz radiation, in other words, of which the image information corresponds to sources, reflectors or diffusers of Terahertz radiation present in an observation field. However, development of image sensors which are sensitive to Terahertz radiation requires significant investments, so that such sensors are not available to date at prices which would be compatible with the applications considered.

SUMMARY OF THE INVENTION

From this situation, an object of the present invention consists in providing images which reveal sources, reflectors or diffusers of Terahertz radiation that are present in an observation field, at a cost which is low, or in other words, around or slightly greater than that of an infrared image acquisition system.

An additional object of the invention is to provide such images which belong to the spectral range of Terahertz radiation, with imaging systems which are simple and easy to use.

Another object of the invention is to provide images which belong to the spectral range of Terahertz radiation, with spatial resolutions which are sharp.

Still another object of the invention is to provide images which belong to the spectral range of Terahertz radiation, but which are limited to within predetermined and easily variable spectral windows. An additional object may be thus to easily provide multispectral images, with some components thereof which belong to the spectral range of Terahertz radiation.

To achieve at least one of these objects or others, a first aspect of the invention proposes a spectral conversion element for electromagnetic radiation, which comprises:

a two-dimensional support, with juxtaposed zones which are dedicated respectively to pixels;

a set of first antennas, called Terahertz antennas, which are rigidly supported by the two-dimensional support and sized to have a first peak for absorbing electromagnetic radiation when a radiation wavelength is between 30 µm and 3 mm, at least one of the Terahertz antennas being situated inside each pixel zone; and a set of second antennas, called infrared antennas, which are also rigidly supported by the two-dimensional support but sized to have a second peak for absorbing electromagnetic radiation when the wavelength of the radiation is between 1 µm and 30 µm, at least one of the infrared antennas being situated inside each pixel zone.

In other words, each Terahertz antenna can absorb Terahertz radiation, possibly in a limited part of the Terahertz spectral range, and also possibly with a selectivity with respect to the polarisation of this radiation.

Simultaneously, each infrared antenna can absorb infrared radiation. According to Kirchhoff law, assumed as well-known, each infrared antenna is also effective for emitting infrared radiation in a spectral window which is superposed to the second electromagnetic radiation absorption peak.

According to a feature of the invention, the conversion element is arranged so that one of the Terahertz antennas and one of the infrared antennas which are both situated in one and same pixel zone, whatever this pixel zone, are thermally coupled to each other with a thermal resistance which is lower than each other thermal resistance which exists between any one of the Terahertz antennas and any one of the infrared antennas when these Terahertz and infrared antennas are situated in the respective pixel zones which are different. In other words, each pixel zone produces a thermal coupling between the Terahertz and infrared antennas of this zone, but with interferences between different pixel zones, commonly called "crosstalk", which are reduced.

The conversion element of the invention therefore forms an energy conversion inside each pixel zone, from the Terahertz radiation which is incident onto each first antenna of this pixel zone, into the infrared radiation which is emitted by each second antenna of this pixel zone. In addition, the first antennas determine the spectral window of sensitivity of the conversion element for the incident Terahertz radiation, and the second antennas determine the spectral window the infrared radiation emitted. The Terahertz radiation energy in the spectral window of the first antennas is thus converted into infrared radiation energy in the spectral window of the second antennas. The conversion is made inside pixel zones, which are uncoupled from each other, to constitute a matrix which enables to conserve information from the spatial zone wherein the Terahertz radiation is or has been incident.

When it is arranged in an object plane of an instrument for capturing infrared images, the conversion element of the invention enables the instrument to capture images which reveal the sources, reflectors or diffusers of Terahertz radiation present in an observation field. Thus, such Terahertz images can be captured for a cost which is substantially similar to the cost amount of the instrument for capturing infrared images and the conversion element proposed by the invention. Yet, the conversion element of the invention, because it can be produced by engraving and material deposit techniques which are mastered today, can have a cost price which is compatible with the applications considered.

Preferably, the conversion element may be arranged so that each thermal resistance between one Terahertz antenna and one infrared antenna which are both situated in one same pixel zone, whatever this pixel zone, is lower than one tenth, preferably lower than one hundredth, of each other thermal resistance which exists between any one of the Terahertz antennas and any one of the infrared antennas when these Terahertz and infrared antennas are situated in respective pixel zones which are different. Thus, interferences—or "crosstalk"—between different pixel zones of the conversion element are sufficiently reduced so that an infrared image which is sharp results from the energy conversion of the Terahertz radiation received into infrared radiation, separately pixel by pixel.

In various embodiments of the invention, each Terahertz or infrared antenna may be of the metal/dielectric/metal type, or be of the Helmholtz resonator type, or again be formed by a portion of a material which is absorbing for Terahertz or infrared radiation, respectively.

Generally, for the invention, the following transverse dimensions, measured parallel to the two-dimensional support, are advantageous:

between 30 µm and 5000 µm, or 5 mm, for each pixel zone, between 1 µm and 300 µm for each Terahertz antenna, and between 0.1 µm and 5 µm for each infrared antenna.

To product an even more effective uncoupling between any two pixel zones which are close to each other, the two-dimensional support may have a connecting portion to connect two close pixel zones and have recesses which limit transversally each connecting portion. Thus, all pixel zones can be connected in the two-dimensional support, whereas the thermal diffusion passages between two pixel zones which are close to each other have sections which are limited by some of the recesses. The conversion element of the invention can thus form one single piece which is easy to handle and to incorporate in an imaging instrument.

Possibly, each Terahertz antenna may have a geometry which is selected among several different geometries corresponding to different polarisations or different wavelengths for electromagnetic radiation which is absorbed with a maximum efficiency. In such case, each pixel zone may comprise at least one of these Terahertz antenna geometries, preferably one single antenna geometry per pixel zone. The Terahertz antenna geometries are then alternated between pixel zones which are different, preferably according to an alternating pattern which is identical in the whole conversion element. The conversion element can thus produce multispectral images and/or images which correspond to different polarisations of the Terahertz radiation which is absorbed. In this manner, more complete information can be collected about the sources, reflector and diffusers of Terahertz radiation which are present in an observation field. When each pixel zone comprises only one single antenna geometry, the different spectral components of each multispectral image, or the different polarisation components of each multi-polarisation image, have a diaphony, or "crosstalk", which is highly reduced or zero. However, a resolution which is finer can be obtained for the multispectral or multi-polarisation image when antennas of different geometries are contained in each pixel zone.

According to first configurations, called in-transmission, which are possible for conversion elements which conform with the invention, the Terahertz antennas on the one hand, and the infrared antennas on the other hand, may be supported by two opposing faces of the two-dimensional support. The thermal resistances are thus produced along thermal diffusion paths which cross the two-dimensional support between the two opposing faces.

According to second configurations, called in-reflection, which are also possible for conversion elements which conform with the invention, the Terahertz antennas and the infrared antennas may be supported together by one and same face of the two-dimensional support. For example, the Terahertz antennas may be distributed in a first part of a layered structure which is supported by the face of the two-dimensional support, and the infrared antennas may be distributed in a second part of the same layered structure, which is situated above or below the first part, with respect to a layer stack order on the face of the two-dimensional support.

A second aspect of the invention proposes a method for collecting Terahertz radiation, which comprises the following actions:

arranging a conversion element which conforms with the first aspect of the invention, in Terahertz radiation so that the conversion element produces infrared radiation from energy of the Terahertz radiation; and arranging an infrared radiation sensor on a trajectory of the infrared radiation which is produced by the conversion element.

For various applications which do not belong to the field of imaging, the infrared radiation sensor may comprise at least one photovoltaic cell, one photoconductive cell, or one bolometric cell, which is effective for absorbing at least one part of the infrared radiation produced by the conversion element.

For imaging applications, the infrared radiation sensor may comprise at least one image detector, which is sensitive to infrared radiation. The method then further comprises actions of:

arranging a lens which is effective for the Terahertz radiation on a trajectory of this Terahertz radiation upstream of the conversion element; and further arranging an imaging system which is effective for the infrared radiation on a trajectory of the infrared radiation between the conversion element and the detector.

The lens thus forms an image of a scene on the conversion element with the Terahertz radiation which originates from the scene, and the imaging system forms an image of the conversion element on the image detector with the infrared radiation which is produced by the conversion element.

BRIEF DESCRIPTION OF THE DRAWINGS

Other specificities and advantages of the present invention will appear in the description below of non-limitative examples of embodiments, in reference to the appended drawings, wherein.

DESCRIPTION OF THE PREFERRED EMBODIMENTS

For clarity sake, the dimensions of the elements which are represented in these figures do not correspond to the actual dimensions, nor to ratios of actual dimensions. In addition, the identical references which are indicated in the different figures mean identical elements, or elements which have identical functions.

Figure 1:
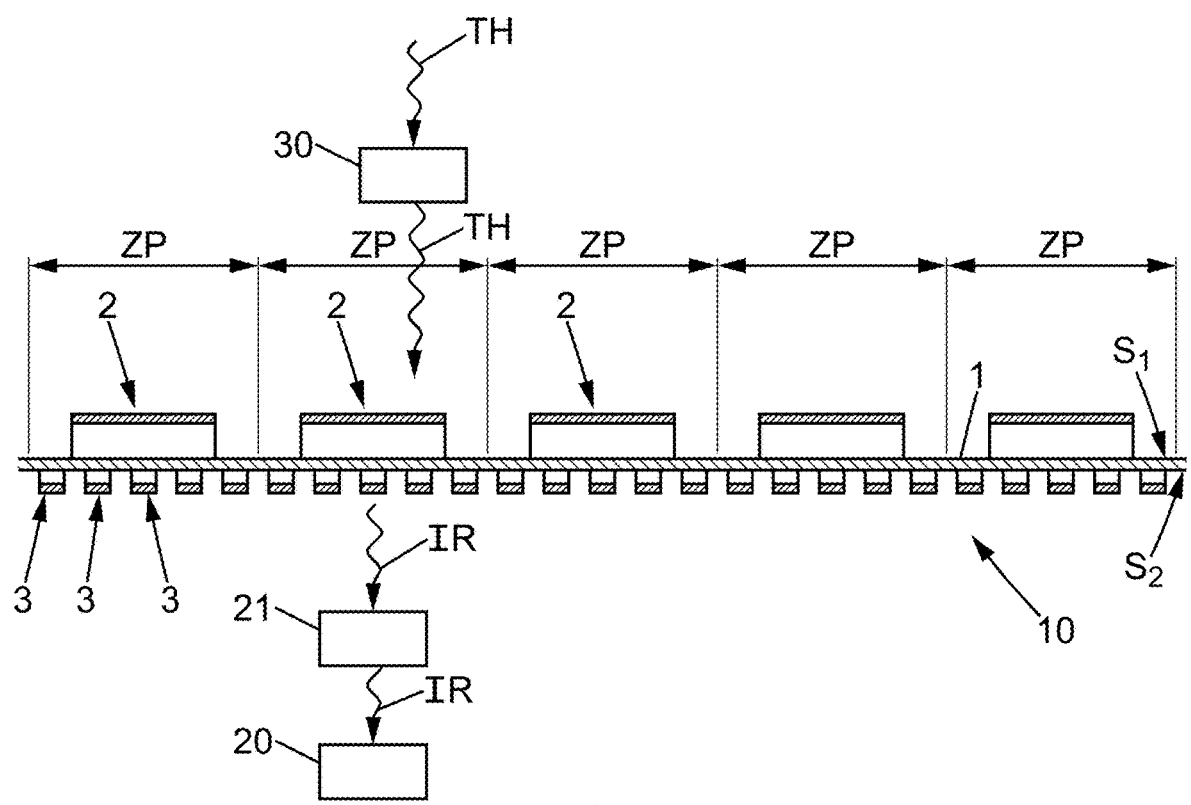
FIG. 1 is a cross-sectional view of a conversion element that conforms with the invention.
Figure 2A:
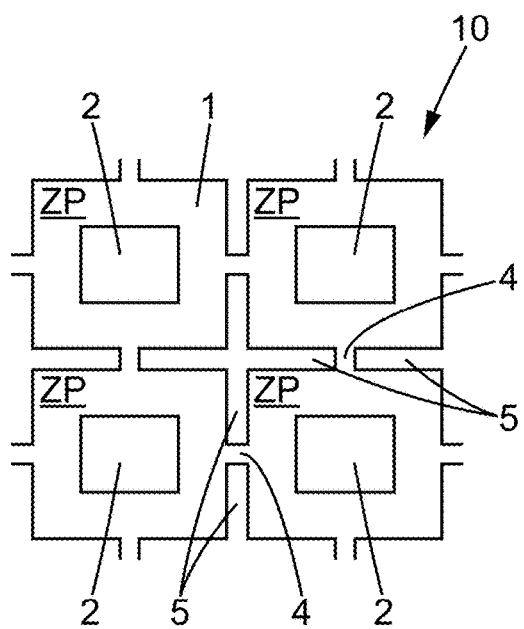
FIGS. 2a and 2b represent the conversion element of FIG. 1, viewed from above and below.
Figure 2B:
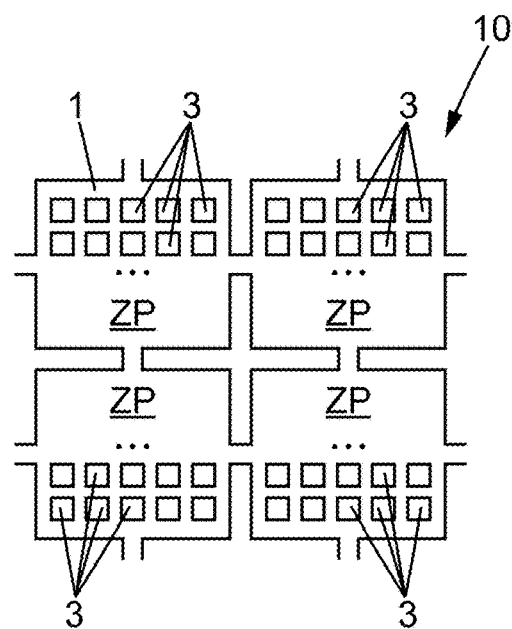
Figure 3:
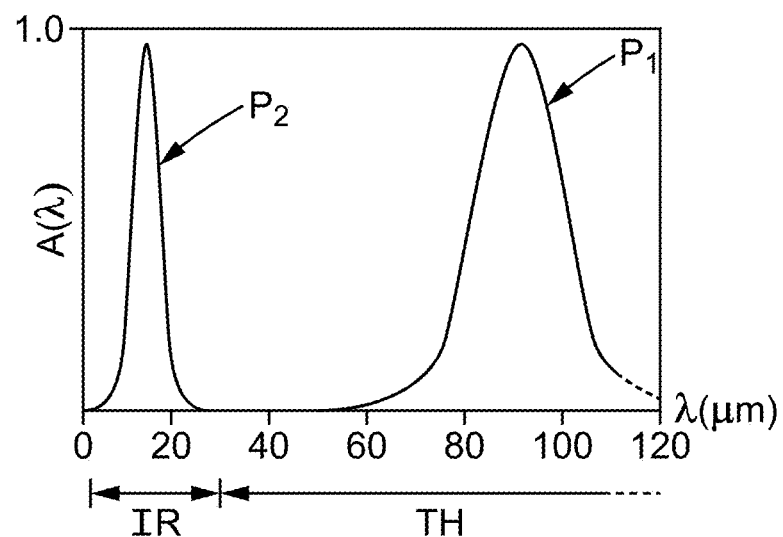
FIG. 3 is an electromagnetic radiation absorption spectral diagram, relating to antennas of a conversion element that conforms with the invention.

According to FIGS. 1, 2a and 2b, a two-dimensional support 1 which may be of the form of a single layer or multilayer film, has two opposing faces referenced $S_1$ and $S_2$ respectively. The face $S_1$ supports the antennas 2, and the face $S_2$ supports the antennas 3. The antennas 2 and 3 have electromagnetic radiation absorption spectral intervals which are separate, as represented in the diagram in FIG. 3: the antennas 2 are absorbing for electromagnetic radiation wavelength values which belong to the range 30 µm-3 mm, corresponding to Terahertz radiation, and the antennas 3 are absorbing for electromagnetic radiation wavelength values which belong to the range 1 µm-30 µm, corresponding to infrared radiation. In FIG. 3, A denotes the wavelength of the electromagnetic radiation, expressed in micrometres, and $A(\lambda)$ denotes the spectral absorption of this radiation. IR denotes the spectral range of the infrared radiation, and TH denotes the spectral range of the Terahertz radiation. Possibly, each antenna 2, called Terahertz antenna, may be selectively absorbing inside a peak referenced $P_1$, which corresponds to a reduced band, or highly reduced band, in the spectral interval of the Terahertz radiation. Likewise, each antenna 3, called infrared antenna, may be selectively absorbing in a peak referenced $P_2$, which corresponds to a reduced band inside the spectral interval of the infrared radiation.

Generally, the absorption of electromagnetic radiation by a material structure depends on the materials of this structure, and possibly further, the geometric dimensions thereof. Thus, each Terahertz antenna 2 has a structure which is designed to produce a significant absorption in the spectral range of Terahertz radiation (peak $P_1$ of the diagram in FIG. 3).

Figure 4A:
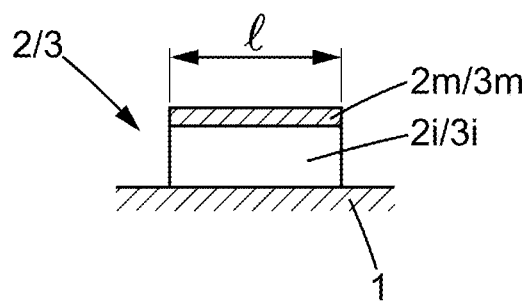
FIGS. 4a to 4c illustrate three possible embodiments for antennas of conversion elements that conform with the invention.

According to a first possible embodiment which is illustrated by FIG. 4a, each antenna 2 may be constituted by a portion 2i of electrically insulating material, which is inserted between two portions of electrically conducting layers, preferably between two portions of metal layers. One of these portions is referenced by 2m, and the other may be a part of the face of the support 1. Such antenna structure is known by the name metal/insulator/metal and is widely documented in available literature. It forms a Fabry-Perot resonator, for which the position in wavelength of the absorption peak $P_1$ depends on the dimensions of the portion 2m measured parallel to the face of the support 1. For example, a length l of the metal portion 2m, called cavity length and measured parallel to the support 1, corresponds to a maximum absorption wavelength of around four times this cavity length l, when the portion of insulating material 2i is made of polyimide, polymethylmethacrylate (PMMA), polyethylene (PET), or epoxy-based negative photosensitive resin, as known by the acronym SU-8. The portion of metal layer 2m may be of gold, copper or aluminium, for example.

When the thermal diffusion lengths which exist parallel to the support 1, between the antennas 2 which are close to each other, are much longer than the thermal diffusion lengths which exist perpendicularly to the support 1, between the antennas 2 and 3 which are coupled inside one same pixel zone, the insulating material 2i may be continuous between the antennas 2 which are close to each other. It can thus form a layer which is continuous, and which can be used as a mechanical support for the spectral conversion element.

Figure 4B:
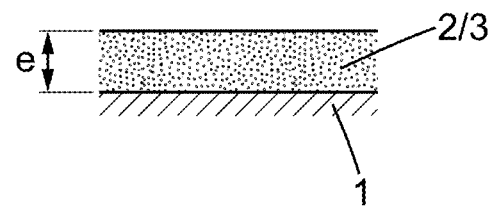

According to a second possible embodiment which is illustrated by FIG. 4b, each antenna 2 may be constituted of a portion of a material which has a significant absorption of the electromagnetic radiation, when this radiation has a wavelength which is between 30 µm and 3 mm. For example, a layer of a doped polymer, such as doped PMMA or doped PET, with thickness e=around 5µ m when it is measured perpendicularly to the support 1, and which is deposited on a metal film which constitutes this support 1, can constitute an antenna 2 for which absorption occurs almost homogenously over the whole Terahertz radiation band. As above, when the thermal diffusion lengths which exist between the antennas 2 which are close to each other are much longer than the thermal diffusion lengths which exist between the antennas 2 and 3 which are coupled inside one same pixel zone, the layer of doped polymer which constitutes the absorbing portions of the Terahertz radiation can be continuous between the antennas 2 close to each other. It can thus also fulfil the mechanical support function for the spectral conversion element.

Figure 4C:
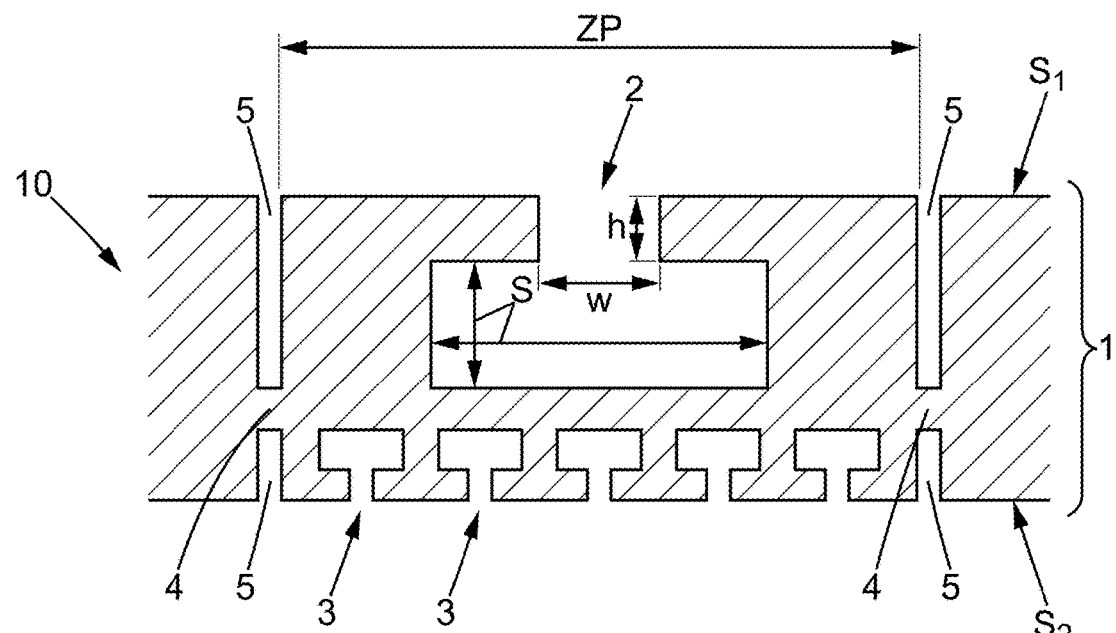

According to a third possible embodiment which is illustrated by FIG. 4c, each antenna 2 may be constituted by a Helmholtz resonator. Such a resonator is constituted by a cavity with metal walls, which is connected to the outside by a collar. Advantageously, but in a non-limitative manner for this embodiment, the support 1 may be of a metal material, and the cavity and the collar are formed in the support 1 from the face $S_1$. The cavity and the collar can be highly elongated perpendicularly to the plane in FIG. 4c, and in this plane, the cavity has a section surface S, and the collar has a width w and a height h. For example, the following values: S=6 µm², w=0.2 µm and h=1 µm, produce an absorption peak $P_1$ which is approximately centred on the wavelength value 50 µm. An abundant bibliography is also available on the subject of such Helmholtz resonators.

In these numerical examples, the other dimension of the antenna 2, which is also measured parallel to the support 1, is assumed to be much greater than the first dimension given above. However, such almost-unidimensional geometry for each antenna is not essential. For example, for the first embodiment in FIG. 4a, based on a portion of electrically insulating material which is inserted between two portions of electrically conducting layers, two-dimensional geometries may be used as represented in FIGS. 2a and 2b. In particular, each antenna may have a rectangular shape in a projection plane which is parallel to the support 1.

For a conversion element such as represented in FIGS. 1, 2a and 2b, each Terahertz antenna is supported by the support 1, so as to be thermally coupled with it, such that the absorption of Terahertz radiation by this antenna 2 produces heat which is transferred to the support 1. For example, for the first embodiment of the antennas 2 (FIG. 4a), the support 1 may form directly one of the two portions of electrically conducting layers. For the second embodiment (FIG. 4b), the portion of the material which is absorbing for the Terahertz radiation may be formed directly on the support 1. Finally, for the third embodiment (FIG. 4c), the support 1 may be of a metal material and be thick enough so that the cavity and the collar can be formed in the support 1 from the face $S_1$ thereof.

For all three embodiments, the support 1 may be a gold (Au), copper (Cu) or aluminium (Al) film, as non-limitative examples.

Each infrared antenna 3 has the function of emitting infrared radiation in the spectral band of wavelength which is between 1 µm and 30 µm, when it receives heat which has been produced through absorbing Terahertz radiation by one of the antennas 2. Each antenna 3 is constituted by at least one other portion of a suitable material, which emits infrared radiation according to the temperature of this portion. When this temperature increases, due to heat received by thermal diffusion originating from one of the Terahertz antennas 2, the amount of infrared radiation emitted also increases, but remaining limited by the emissivity value of the material of this antenna 3. However, the antenna structure which has the absorption peak $P_2$ ensures that this emissivity is significant. In other words, an antenna structure which has an absorption peak for the electromagnetic radiation is also efficient for emitting electromagnetic radiation at a wavelength of this absorption peak when it is heated.

The three embodiments which have been described above for the Terahertz antennas 2 can be revisited in their principles for infrared antennas 3, however by adapting the materials used and the geometric dimensions for an absorption peak $P_2$ which is situated in the wavelength interval between 1 μm and 30 μm.

In particular, for the first embodiment, of metal/insulator/metal type, the insulating material portion, now referenced 3$i$ in FIG. 4$a$, may be of zinc sulphide (ZnS), but also of silica (SiO$_2$), of silicon carbide (SiC), silicon or germanium, whereas the portion of electrically conducting material 3$m$, as well as the related part of the support 1, may be again of gold, copper or aluminium. The numerical formula of the Fabry-Perot resonators is still applicable for this embodiment of the antennas 3, to determine the cavity length l as a function of the maximum absorption wavelength which is desired for the peak $P_2$. For example, when the portion of material 3$i$ is of zinc sulphide, the value of 2 μm for the cavity length l produces the value of 10 μm for the central wavelength of the absorption peak $P_2$.

For the second embodiment (FIG. 4$b$), the absorbing material to use for each infrared antenna 3 may be silica (SiO$_2$). When the thickness e of this silica layer is around 0.7 μm, and when this layer is deposited again on a metal film which constitutes the support 1, an average emissivity which is greater than 50% is obtained in the wavelength interval between 8 μm and 12 μm.

Finally, for the third embodiment, with Helmholtz resonator, the values 0.65 μm$^2$ for the cavity section S, 0.2 μm for the collar width w, and 0.5 μm for the collar height h, correspond to a central wavelength of 10 μm for the absorption peak $P_2$.

The support 1 and the antennas 2 and 3 which are supported by it form a spectral conversion element that conforms with the invention, generally referenced 10. For the operation of this conversion element 10, each Terahertz antenna 2 must be coupled thermally and efficiently to at least one infrared antenna 3 which is assigned thereto. However, several infrared antennas 3 may be assigned to one and same Terahertz antenna 2. Antenna 2 which is coupled thermally and effectively with an antenna 3 means that the thermal diffusion resistance between these two antennas is lower by a factor of at least 10 or 100 than a thermal diffusion resistance which exists between the antenna 2 and an antenna 3 which is not assigned to it. Such a selective thermal coupling may be obtained by a suitable distribution of the antennas 2 and 3 parallel to the two-dimensional support 1: the antennas 2 and 3 which are connected to each other may be situated in line with each other along the direction perpendicular to the face $S_1$ of the support 1, or a little farther away from each other parallel to the face $S_1$, whereas the antennas 2 and 3 which are not connected are farther away from each other parallel to the face $S_1$.

According to a practical design of the conversion element 10, separate zones, called pixel zones, are defined on the two-dimensional support 1, on the face $S_1$ thereof, for example according to an array arrangement, in rows and in perpendicular columns. Two antennas 2 and 3 which are then situated in one same pixel zone ZP are thermally coupled to each other in the meaning which has been defined above, whereas the antennas 2 and 3 which are situated in different pixel zones ZP have, between them, a less intense thermal coupling, in other words, an inter-pixel thermal diffusion resistance which is at least 10 times, otherwise at least 100 times, greater than the intra-pixel thermal diffusion resistance.

To increase further the ratio between the inter-pixel and intra-pixel thermal diffusion resistance values, it is possible for the support 1 to have cuts between the pixel zones ZP. In this manner, a thermal diffusion section is reduced between the pixel zones ZP which are close to each other, thus increasing the inter-pixel thermal diffusion resistance value. In FIGS. 2$a$ and 2$b$, the references 5 indicate the cuts, or recesses, which are arranged between the pixel zones ZP which are close to each other. The references 4 denote residual connecting portions of the support 1, between the cuts 5, which ensure the mechanical cohesion of the whole conversion element 10.

For the embodiment of FIG. 4$c$, where the antennas 2 and 3 are both of the Helmholtz resonator type, the conversion element 10 may be only constituted by the support 1 of a metal material, which is provided with cavities and collars which form the resonators. Possibly, the faces $S_1$ and $S_2$ thereof may be covered with an insulating material, to protect the cavities, in particular against the corrosion of the metal material. Such embodiment requires that the support 1 is thicker. Then, the recesses 5 may be designed to locally thin the support 1, between the adjacent pixel zones, with the same aim of reducing the inter-pixel thermal coupling.

For example, the pixel zones ZP may have a pitch of around 1 mm along the directions of rows and columns of the array of the conversion element 10. Inside each pixel zone ZP, each Terahertz antenna 2 may have a transverse dimension which is smaller than 0.3 mm, parallel to the face $S_1$ of the support 1, and each infrared antenna 2 may have a transverse dimension which is smaller than 5 μm, again parallel to the face $S_1$ of the support 1, these antenna transverse dimensions depending on the central wavelengths which are desired for the absorption peaks $P_1$ and $P_2$, as explained above. Under these conditions, each pixel zone ZP may contain one single Terahertz antenna 2 and a multitude of infrared antennas 3, the latter possibly distributed inside the pixel zone ZP along a square lattice, for example. FIGS. 1, 2$a$ and 2$b$ illustrate such geometry for the conversion element 10.

Given such dimensions for the pixel zones ZP and for the antennas 2 and 3, it is also possible to have several Terahertz antennas 2 inside each pixel zone ZP, all the pixel zones ZP having identical configurations. Thus, inside each pixel zone ZP, the Terahertz antennas 2 which have different geometries can correspond to positions in wavelength of the absorption peak $P_1$ which are separate. The distribution of the infrared antennas 3 in each pixel zone ZP enables again to emit infrared radiation in response to the absorption of Terahertz radiation by any one of the Terahertz antennas. In this manner, the conversion element 10 can have a spectral interval of sensitivity which is increased, with respect to using one single geometry of Terahertz antennas.

Moreover, it is also possible to assign different Terahertz antenna geometries, producing different spectral positions for the absorption peak $P_1$, to pixel zones ZP which are close to each other, in particular by using a determined alternating pattern for Terahertz antenna geometries between the pixel zones ZP, such as a Bayer filter. The conversion element 10 will thus enable to relay multispectral Terahertz images, when it will be implemented for an imaging function as explained later.

Alternatively or in combination, Terahertz antennas 2 which have different geometries can be sensitive to separate polarisations of Terahertz radiation. Indeed, in a known manner, the shape of each antenna 2 parallel to the face $S_1$ of the support 1, determines a polarisation of the radiation for which this antenna has a greater efficiency, or sensitivity. The image data which are thus collected, comprise polarisation information which can be useful for certain applications, in particular, environmental monitoring applications and recognition of intruder elements.

A conversion element 10 which conforms with the invention can have an in-transmission configuration, or an in-reflection configuration.

FIGS. 1, 2a and 2b correspond to the in-transmission configuration. In this case, the Terahertz antennas 2 and the infrared antennas 3 are situated on the two opposing faces of the support 1: the antennas 2 on the face $S_1$ and the antennas 3 on the face $S_2$, opposite the face $S_1$, in accordance with FIG. 1. The thermal coupling between the antennas 2 and 3 is thus produced by the thermal diffusion paths which cross the support 1 between the faces $S_1$ and $S_2$. Such in-transmission configuration generally enables the implementations of the conversion element 10 which are simpler.

Figure 5:
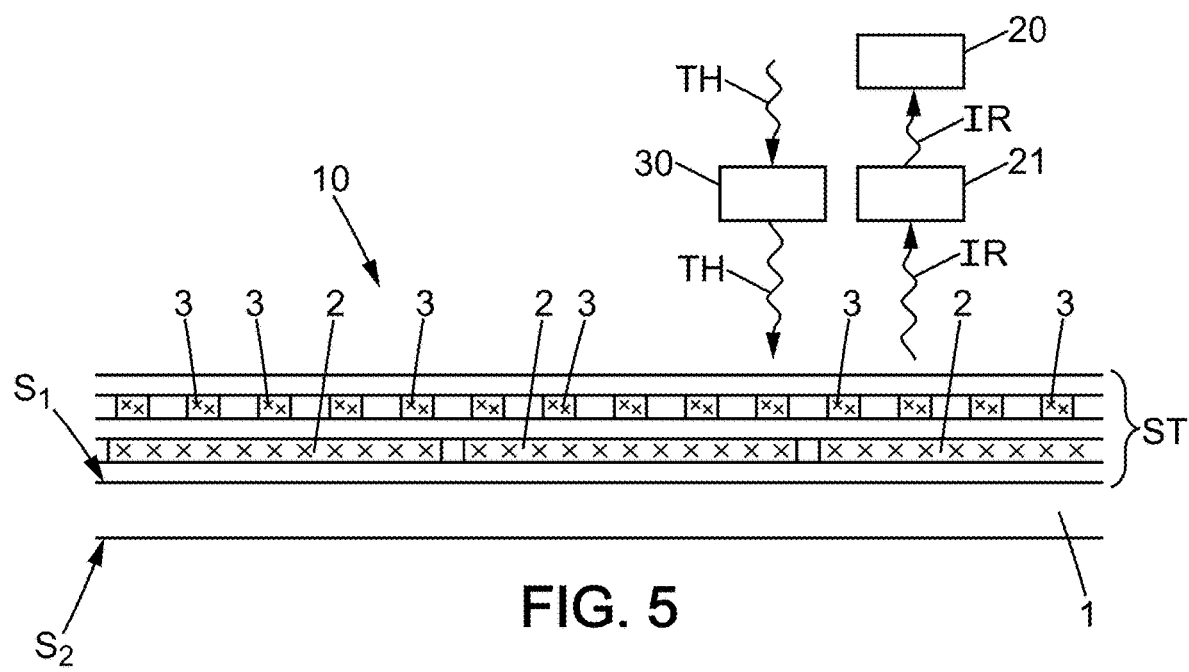
FIG. 5 corresponds to FIG. 1 for a different configuration of a conversion element that also conforms with the invention.

FIG. 5 illustrates the in-reflection configuration. In this case, all antennas 2 and 3 are situated on the face $S_1$ of the support 1. According to a possible embodiment for such in-reflection configuration, the antennas 2 and 3 can be produced within a multilayered structure ST which is formed only on the face $S_1$ of the support 1. For example, the antennas 2 can be formed within a lower part of the structure ST closer to the support 1, and the antennas 3 can be formed within an upper part of the structure ST, farther away from the support 1. Such configuration is pushed if the infrared antennas 3 are transparent enough for the Terahertz radiation, which is intended for the underlying antennas 2 within the structure ST. An advantage of such in-reflection configuration results from the increased proximity between the antennas 2 and 3 which are coupled, producing a thermal coupling between them which is increased.

First applications for a conversion element 10 which conforms with the invention may consist in collecting radiative energy which belongs to the Terahertz range, for example originating from a heat source or the sun. To this end, the face of the support 1 which supports the Terahertz antennas 2 is exposed to the Terahertz radiation, and a sensor which is efficient for absorbing infrared radiation, for example a photovoltaic, photoconductive or bolometric cell, is placed for facing the face of the support 1 which supports the infrared antennas 3. In FIGS. 1 and 5, the references TH and IR respectively denote the Terahertz radiation, of which the energy is collected, and the infrared radiation which is transmitted to the sensor, itself referenced 20. Possibly, a TH radiation concentrator, symbolically referenced 30, may be used to increase the amount of TH radiation collected. The concentrator 30 may in particular be a mirror, for example a parabolic mirror. Likewise, an infrared radiation concentrator, referenced 21, may be used between the conversion element 10 and the infrared sensor 20.

Second applications for a conversion element 10 which conforms with the invention relate to the acquisition of images formed with Terahertz radiation. To this end, a lens which is effective for Terahertz (TH) radiation is arranged between a scene to be observed and the face of the support 1 which supports the Terahertz antennas 2. Reference 30 now denotes such lens, symbolically for such imaging applications. Such lens may be mirror-based, or based refracting components which are effective for the Terahertz radiation, for example of polytetrafluoroethylene (PTFE known under the brand name of Teflon™), or of polyimide, PMMA, PET, etc. Reference 20 then denotes an infrared image detector, which is sensitive to infrared radiation such as produced by the conversion element 10. This may be, for example, an array-type detector. Under these conditions, reference 21 denotes an imaging system, which is efficient for the infrared radiation, and which optically conjugates the face of the support 1 which supports the infrared antennas 3 with the photosensitive surface of the image detector 20. The image resolution which is thus obtained mainly depends on the size of the pixel zones ZP of the conversion element 10, as well as the resolution of the image detector 20. In addition, when the conversion element 10 comprises several Terahertz antennas 2 per pixel zone ZP, and when these are sensitive to different wavelengths of the Terahertz range, then the conversion element 10 enables capturing a multi-spectral image at each acquisition cycle of the image detector 20.

It is understood that the invention can be reproduced by adapting or modifying certain secondary aspects thereof, with respect to the embodiments which have been described in detail above. In particular, using recesses in the two-dimensional support between adjacent pixel zones is not essential, although preferred.

The invention claimed is:

1. Spectral conversion element (10) for electromagnetic radiation, comprising:
    a two-dimensional support (1), with juxtaposed zones (ZP) which are respectively dedicated to pixels;
    a set of first antennas (2), called Terahertz antennas, which are rigidly supported by the two-dimensional support (1) and sized to have a first absorption peak ($P_1$) for the electromagnetic radiation when a wavelength of the radiation is between 30 µm and 3 mm, corresponding to radiation referred to as Terahertz, at least one of the Terahertz antennas being situated inside each pixel zone (ZP); and
    a set of second antennas (3), called infrared antennas, which are also rigidly supported by the two-dimensional support (1) but sized to have a second absorption peak ($P_2$) for the electromagnetic radiation when the wavelength of the radiation is between 1 µm and 30 µm, corresponding to radiation referred to as infrared, at least one of the infrared antennas being situated inside each pixel zone (ZP);
    the conversion element being arranged so that one of the Terahertz antennas (2) and one of the infrared antennas (3) which are both situated in one same pixel zone (ZP), whatever said pixel zone, are thermally coupled with each other, with a thermal resistance which is lower than each other thermal resistance which exists between any one of the Terahertz antennas and any one of the infrared antennas when said Terahertz and infrared antennas are situated in the respective pixel zones which are different.

2. Conversion element (10) according to claim 1, arranged so that each thermal resistance between one Terahertz antenna (2) and one infrared antenna (3) which are both situated in one same pixel zone (ZP), whatever said pixel zone, are lower than one tenth of each other thermal resistance which exists between any one of the Terahertz antennas and any one of the infrared antennas when said Terahertz and infrared antennas are situated in the respective pixel zones which are different.

3. The conversion element (10) according to claim 2, wherein each thermal resistance between said one Terahertz antenna (2) and said one infrared antenna (3) which are both situated in one same pixel zone (ZP), whatever said pixel zone, are lower than one hundredth, of each other thermal resistance which exists between any one of the Terahertz antennas and any one of the infrared antennas when said Terahertz and infrared antennas are situated in the respective pixel zones which are different.

4. Conversion element (10) according to claim 2, wherein each Terahertz antenna (2) or infrared antenna (3) is of metal/dielectric/metal type, or is of Helmholtz resonator type, or is formed by a portion of a material which is absorbing for infrared radiation or Terahertz radiation, respectively.

5. Conversion element (10) according to claim 2, wherein each pixel zone (ZP) has transverse dimensions which are between 30 µm and 5000 µm, each Terahertz antenna (2) has a transverse dimension which is between 1 µm and 300 µm, and each infrared antenna (3) has a transverse dimension which is between 0.1 µm and 5 µm, said transverse dimensions being measured parallel to the two-dimensional support (1).

6. Conversion element (10) according to claim 2, wherein the two-dimensional support (1) has connecting portions (4) to connect any two pixel zones (ZP) which are close to each other, and has recesses (5) which transversally limit each connecting portion, so that all the pixel zones are connected in said two-dimensional support, and that thermal diffusion passages between two pixel zones which are close to each other have sections limited by some of the recesses.

7. Conversion element (10) according to claim 1, wherein each Terahertz antenna (2) or infrared antenna (3) is of metal/dielectric/metal type, or is of Helmholtz resonator type, or is formed by a portion of a material which is absorbing for infrared radiation or Terahertz radiation, respectively.

8. Conversion element (10) according to claim 7, wherein each pixel zone (ZP) has transverse dimensions which are between 30 µm and 5000 µm, each Terahertz antenna (2) has a transverse dimension which is between 1 µm and 300 µm, and each infrared antenna (3) has a transverse dimension which is between 0.1 µm and 5 µm, said transverse dimensions being measured parallel to the two-dimensional support (1).

9. Conversion element (10) according to claim 7, wherein the two-dimensional support (1) has connecting portions (4) to connect any two pixel zones (ZP) which are close to each other, and has recesses (5) which transversally limit each connecting portion, so that all the pixel zones are connected in said two-dimensional support, and that thermal diffusion passages between two pixel zones which are close to each other have sections limited by some of the recesses.

10. Conversion element (10) according to claim 1, wherein each pixel zone (ZP) has transverse dimensions which are between 30 µm and 5000 µm, each Terahertz antenna (2) has a transverse dimension which is between 1 µm and 300 µm, and each infrared antenna (3) has a transverse dimension which is between 0.1 µm and 5 µm, said transverse dimensions being measured parallel to the two-dimensional support (1).

11. Conversion element (10) according to claim 10, wherein the two-dimensional support (1) has connecting portions (4) to connect any two pixel zones (ZP) which are close to each other, and has recesses (5) which transversally limit each connecting portion, so that all the pixel zones are connected in said two-dimensional support, and that thermal diffusion passages between two pixel zones which are close to each other have sections limited by some of the recesses.

12. Conversion element (10) according to claim 1, wherein the two-dimensional support (1) has connecting portions (4) to connect any two pixel zones (ZP) which are close to each other, and has recesses (5) which transversally limit each connecting portion, so that all the pixel zones are connected in said two-dimensional support, and that thermal diffusion passages between two pixel zones which are close to each other have sections limited by some of the recesses.

13. Conversion element (10) according to claim 1, wherein each Terahertz antenna (2) has a geometry which is selected among several different geometries, said Terahertz antenna geometries corresponding to different polarisations or different wavelengths for the electromagnetic radiation which is absorbed with a maximum effectiveness,
and wherein each pixel zone (ZP) comprises at least one of said Terahertz antenna geometries (2), and the Terahertz antenna geometries are alternated between pixel zones which are different.

14. Conversion element (10) according to claim 13, wherein each pixel zone (ZP) comprises one single antenna geometry.

15. Conversion element (10) according to claim 14, wherein the Terahertz antenna geometries are alternated between pixel zones which are different, according to an alternating pattern which is identical in the whole conversion element (10).

16. Conversion element (10) according to claim 1, wherein both the Terahertz antennas (2) and the infrared antennas (3) are supported by two opposing faces of the two-dimensional support (1), the thermal resistances being produced along thermal diffusion paths which cross the two-dimensional support between the two opposing faces.

17. Conversion element (10) according to claim 1, wherein the Terahertz antennas (2) and the infrared antennas (3) are supported together by one same face of the two-dimensional support (1), for example the Terahertz antennas are distributed in a first part of a layered structure (ST) which is supported by the face of the two-dimensional support, and the infrared antennas are distributed in a second part of the layered structure which is situated above or below said first part of the layered structure, with respect to a layer stack order on the face of the two-dimensional support.

18. Method for collecting a Terahertz radiation (TH), said method comprising:
arranging a conversion element (10) which conforms with claim 1, in the Terahertz radiation (TH) so that the conversion element produces infrared radiation (IR) from energy of the Terahertz radiation; and
arranging an infrared radiation sensor (20) on a trajectory of the infrared (IR) radiation which is produced by the conversion element (10).

19. Method according to claim 18, wherein the infrared radiation sensor (20) comprises at least one photovoltaic cell, one photoconductive cell, or one bolometric cell, effective for absorbing at least one part of said infrared (IR) radiation.

20. Method according to claim 18, wherein the infrared radiation sensor (20) comprises at least one image detector which is sensitive to the infrared radiation (IR), and the method further comprises arranging a lens (30) which is effective for the Terahertz radiation (TH) on a trajectory of said Terahertz radiation upstream of the conversion element (10), and also arranging an imaging system (21) which is effective for the infrared radiation on the trajectory of said infrared radiation (IR) between the conversion element (10) and the image detector (20), the lens (30) forming an image of a scene on the conversion element (10) with the Terahertz radiation (TH) which originates from the scene, and the imaging system (21) forming an image of the conversion element (10) on the image detector (20) with the infrared radiation (IR) which is produced by said conversion element.

\* \* \* \* \*